United States Patent [19]

Caughey

[11] 4,268,274
[45] May 19, 1981

[54] GASIFICATION RETORT

[75] Inventor: Robert A. Caughey, Antrim, N.H.

[73] Assignee: Forest Fuels, Inc., Marlborough, N.H.

[21] Appl. No.: 55,386

[22] Filed: Jul. 9, 1979

[51] Int. Cl.³ .............................. C10J 3/20; C10S 3/40
[52] U.S. Cl. ...................................... 48/111; 110/229; 110/270; 110/273; 202/117
[58] Field of Search ................. 48/209, 111, 89; 201/32; 202/117; 110/240, 241, 229, 267, 270, 273

[56] References Cited

U.S. PATENT DOCUMENTS

| | | | |
|---|---|---|---|
| 510,581 | 12/1893 | Coxe | 110/270 |
| 1,480,965 | 1/1924 | Steinmuller et al. | 110/270 |
| 2,380,930 | 8/1945 | Andersen et al. | 201/32 |
| 3,434,932 | 3/1969 | Mansfield | 201/32 |
| 4,030,895 | 6/1977 | Caughey | 48/209 |
| 4,095,958 | 6/1978 | Caughey | 48/209 |

*Primary Examiner*—Peter F. Kratz
*Attorney, Agent, or Firm*—Robert T. Gammons

[57] ABSTRACT

Apparatus for progressively burning biomass material comprising a retort defining a chamber, a linearly moving grate bed enclosed within the chamber with a space below and a space above for respectively supplying primary air to the lower side of the grate and for collecting gases generated by progressive distillation of the biomass material at the upper side of the grate. Primary air is supplied to the underside of the grate bed at different pressures lengthwise of the grate by a distribution chamber extending lengthwise of the grate of V-shaped cross section containing at its bottom a Venturi opening through which air is delivered to the distribution chamber from successive longitudinally-arranged plenum chambers which, in turn, are supplied with air through conductors connected to a primary air source, each of which contains a damper. The grate may be horizontal or inclined.

39 Claims, 7 Drawing Figures

GASIFICATION RETORT

BACKGROUND OF THE INVENTION

In my U.S. Pat. Nos. 4,030,895 and 4,095,958, there are shown and described retort apparatus designed to generate combustible fuel gases from biomass material. In each patented apparatus, there is a fixed, downwardly-inclined grate supported within an enclosure defining a chamber and a grate dividing the chamber into a plenum chamber beneath the grate and a combustion chamber above the grate. The biomass material is fed to the upwardly-facing side of the grate at the upper end and the ash is removed from the upwardly-facing side of the grate at the lower end. The grate in U.S. Pat. No. 4,040,895 is comprised of spaced, parallel grate bars arranged transversely of the chamber and the biomass moves gravitationally downwardly over the surface thereof. The grate in U.S. Pat. No. 4,095,958 is also stationary and comprises an inclined flat plate containing a plurality of holes. The biomass is fed to the upper end of the plate and slides downwardly thereon by gravity. In the latter apparatus, longitudinally-spaced, parallel fins at the underside of the grate were provided in order to keep the grate as cool as possible and thereby reduce the formation of slag. It is the purpose of this invention to provide a retort with an improved grate system with a moving grate and under grate air distribution which permits operation over a wide range of firing rates while maintaining a low grate temperature well within a reasonable working range of available alloys suitable for grate construction, hence, substantially lengthening the working life of the grate and reducing the operating temperature of the under grate structure, thus relieving thermal stress and reducing heat loss.

SUMMARY OF THE INVENTION

Apparatus for burning biomass material comprising a retort defining a chamber, one or more grate beds supported in the chamber with a space above and a space below and means at the underside of the grate beds defining distribution chambers substantially coextensive in width and length with the grate beds. The bottom of each of the distribution chambers is V-shaped and contains midway of its length a narrow, longitudinally-extending opening of Venturi configuration and there is means for supplying air to each distribution chamber through the opening at the bottom thereof. The means for supplying air to each distribution chamber comprises plenum chambers arranged lengthwise of the underside of each distribution chamber, each of the plenum chambers being, in turn, supplied with air from conductors connected to a common source of air and each of which contains a damper. Each plenum chamber contains at its bottom a port through which air is supplied from the conductor connecting it to the common source and a pressure equalizing baffle which slopes downwardly from the Venturi opening across the port. The retort contains inlet openings adjacent one end of the grate beds through which biomass material is introduced for deposit on the grate beds, an ash pit at the other ends of the grate beds for removing the ash and a discharge opening above the grate beds through which the gas generated by destructive distillation of the biomass is discharged. The grate beds are endless belts entrained about sprockets and each comprises spaced, parallel, flat bars with spaces between them of sufficient width to permit air to rise upwardly through the bed, but too narrow to prevent the biomass from sifting through. There is a conveyor for supplying the biomass material to the grate bars at the one end and a conveyor at the other ends for discharging the ash and clinkers from the other end. Desirably, there is a rotary gate or pivotally suspended gate at the discharge ends of the grates for preventing air from entering the space above the grates while permitting the ash to be discharged.

The invention will now be described in greater detail with reference to the accompanying drawings, wherein.

The reactor of this invention, like those shown in my U.S. Pat. Nos. 4,030,895 and 4,095,958, is designed to generate combustible fuel gases from biomass materials by progressive destructive distillation of the biomass material and as herein illustrated is provided with an improved grate system and controlled air flow at the underside of the grates which enables operating at a lower temperature and, hence, substantially increasing the working life of the system without sacrifice of efficiency.

Figure 2:
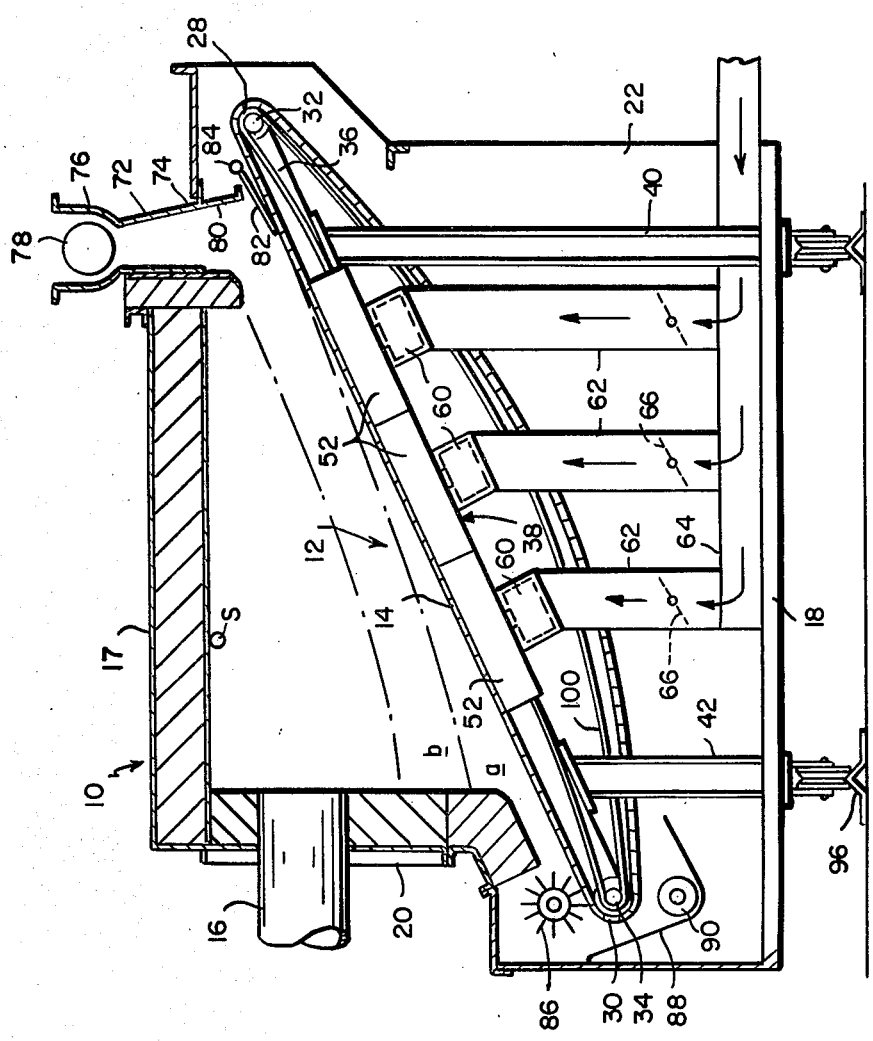
FIG. 2 is a side elevation as seen from the right side of FIG. 1 partly in section.
Figure 1:
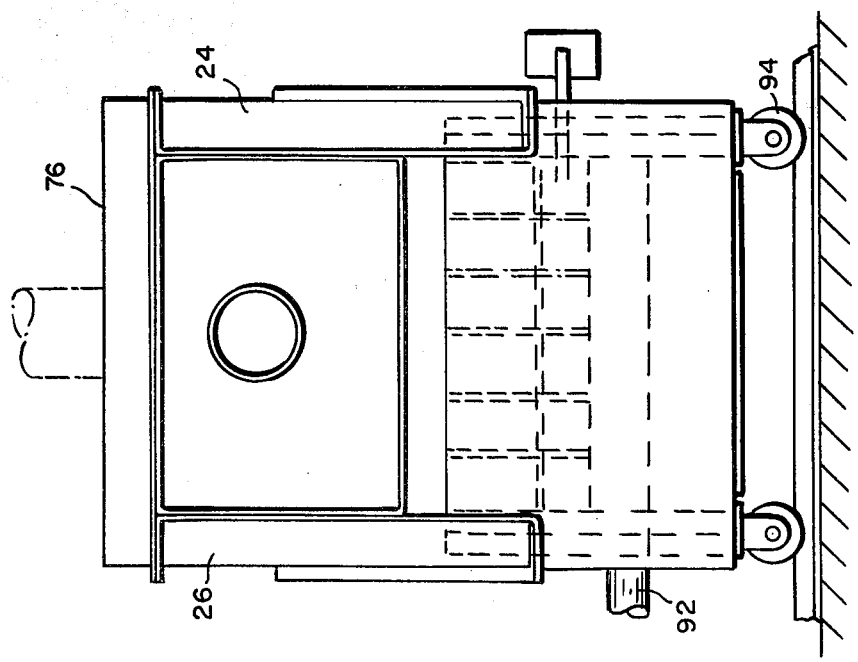
FIG. 1 is a front elevation of one form of retort wherein the grate beds are inclined.

Referring to the drawings, FIGS. 1 and 2, the reactor comprises a retort 10 within which there is mounted a grate system 12 by means of which biomass material delivered to the top of moving grates 14 is subjected to progressive distillation as it is moved downwardly thereon to the bottom where the ash is removed. The gases generated by the distillation are collected in the retort above the grates and drawn off through a conductor 16 for delivery to the fire box of a domestic heating unit or commercial boiler.

The retort 10 comprises a sheet metal box of generally rectangular, vertical and horizontal section having horizontal top and bottom walls 17 and 18 and vertical front, back and side walls 20, 22, 24 and 26. The top wall 17 is partially lined with fire-resistance material such as refractory brick or the like and the front wall 20 is also partially lined with a refractory material.

Figure 3:
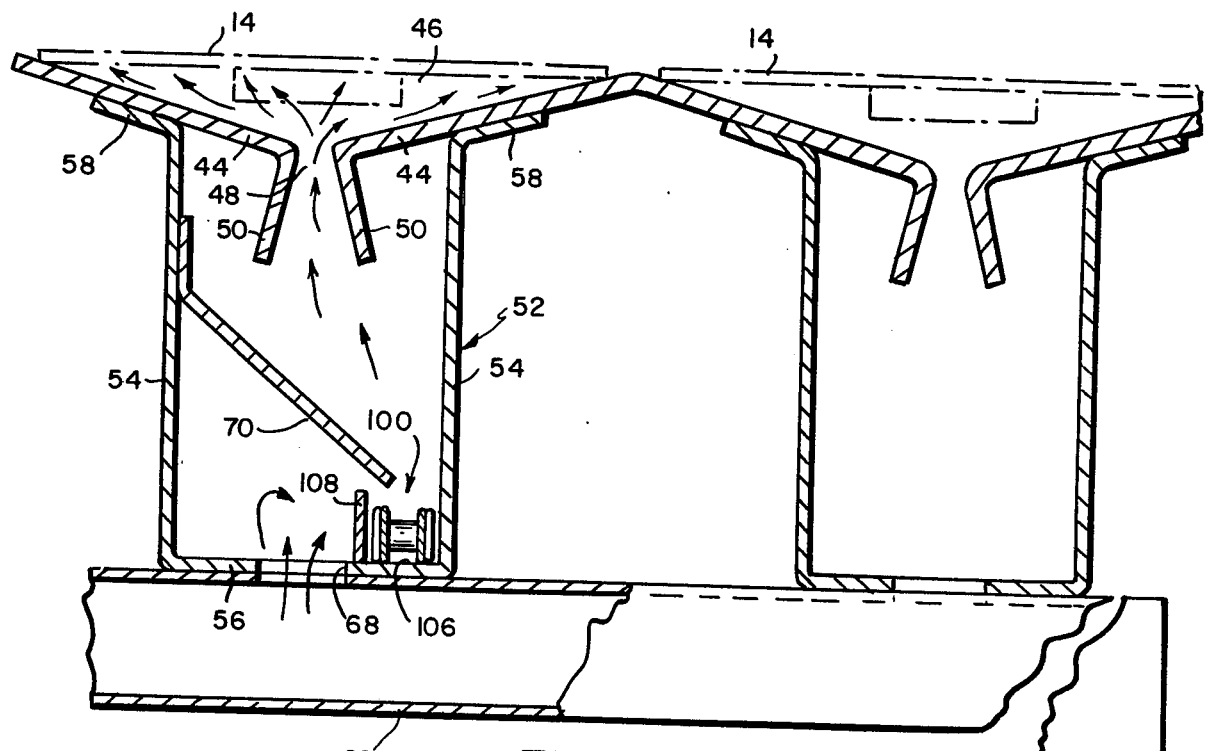
FIG. 3 is an enlarged fragmentary transverse section.
Figure 5:
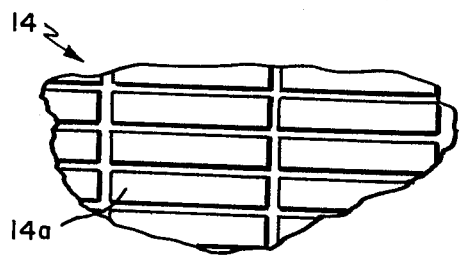
FIG. 5 is a fragmentary plan view of the grate bars comprising the grate beds.

The retort is of sufficient transverse width to receive two or more side-by-side grates 14, FIGS. 3 and 5, and as herein illustrated, FIG. 1, there are six side-by-side grates. A single grate may be used where a small volume of gas is sufficient.

Figure 4:
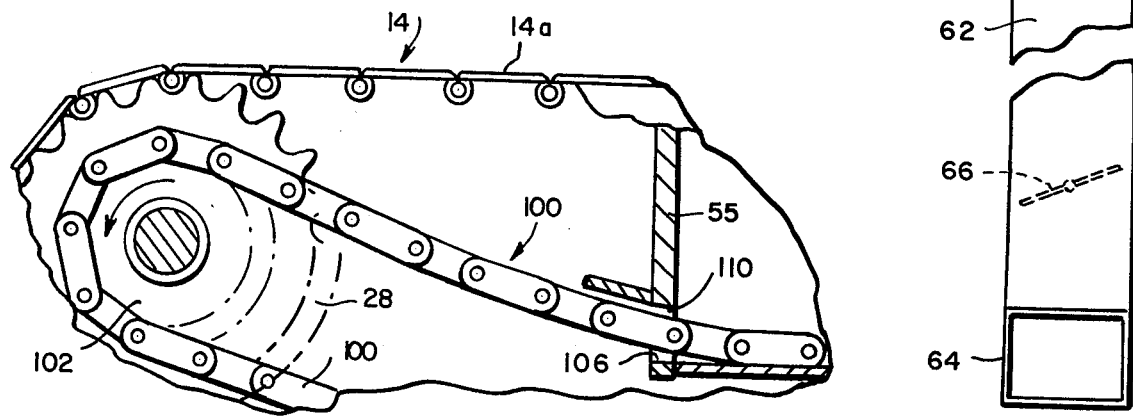
FIG. 4 is a fragmentary elevation of the grate beds at one end showing sand chains for removing incombustible material which falls into the plenum chambers.

Each grate 14, FIGS. 4 and 5, is in the form of an endless belt made up of a plurality of spaced, parallel, flat plates 14a hingedly connected to each other with a spacing of approximately 1/16 of an inch between bars. The bars are, respectively, 6 inches long and 1 7/16 inches wide. The grates, FIGS. 2 and 4, are entrained about longitudinally-spaced sprocket wheels 28 at one end and 30 at the other end, the sprockets, in turn, being rotatably mounted on shafts 32 and 34 rotatably supported between spaced, parallel rails 36 comprising a supporting frame. In one form, the frame 38 is supported at its ends in an inclined position by vertically-disposed posts 40 at the upper end and 42 at the lower end. The shaft 34 is connected to a suitable drive motor not shown so that, during operation, the grate is moved continuously downwardly along an inclined path.

The spacing of the grate bars 14a is such as to permit air delivered to the underside of the grates to pass upwardly through the grate bars and through the biomass material resting thereon to support combustion and provide for destructive distillation of the biomass, but narrow enough to prevent the biomass itself from sifting through the grate.

In accordance with this invention, flow control baffles 44—44 are provided at the underside of each of the grates defining at the underside a distribution chamber 46, FIG. 3, and a restricted Venturi opening 48 through which air is delivered to the distribution chamber 46. The control baffles form a V-shaped trough at the underside of the grate slightly wider than the overall width of the grate so that, as the grate travels down the incline, it rests on the longitudinal edge of the baffles and will always assume a central position. The shallowness of the V-shaped trough provides a uniform air flow across the underside of the grate to achieve maximum cooling. The flow control baffles 44—44 extend longitudinally of the grate, terminating short of both the upper and lower ends and have downwardly-extending, diverging flanges 50—50 along the opposite sides of the constricted opening 48. Delivery of air to the distribution chamber 46 through the Venturi opening 48 which is at the center line of the grate provides for distribution to the underside of the grate at uniform pressure throughout its width.

Air is supplied to each distribution chamber 46 through the Venturi opening 48 from plenum chambers 52 of which there are three arranged in succession at the underside of the flow control baffles and which divide the active portion of the grate, that is, the portion where generation of the gases takes place, into three zones. Each plenum chamber 52, FIG. 3, is of substantially rectangular configuration having spaced, parallel side walls 54—54, end walls 55—55, a bottom wall 56 and at the top diverging flanges 58—58 upon which the flow control baffles 44—44 rest. The plenum chambers in each zone transversely of the retort are supported on a horizontally-disposed plenum duct 60 which is closed at one end and is connected at its other end to a vertical conduit 62, the lower end of which is connected to a horizontal conduit 64 which provides a supply for each of the transverse groups of plenum chambers. The vertical conduit 62 which supplies air to a transverse group of plenum chambers contains a damper 66 so that the supply of air to each transverse group may be independently controlled with resepect to the remaining transverse groups. The bottom of each plenum chamber contains an orifice 68 through which air from the conduit 60 is supplied to the plenum chamber and within each plenum chamber there is a pressure-equalizing baffle 70 which is inclined downwardly so as to be interposed between the orifice 68 and the opening 48 and to thus cause the air entering the bottom of the plenum chamber to be distributed at a uniform pressure to the Venturi opening 48.

As shown in FIG. 1, there are six grates transversely of the retort; however, the retort may be provided with a lesser number of grates without departing from the spirit of the invention.

The biomass material is delivered to the upper ends of the grates through a duct 72, FIG. 2, set into an opening 74 in the top wall 17 of the retort. The duct is connected at its upper end to a transversely-arranged trough 76 containing a feed screw 78. The lower end of each duct is provided with an extension 80 which terminates adjacent the upper side of an apron 82 which is pivotally supported on a transversely-extending bar 84 with its distal edge resting on the grates so that the biomass material descending through the ducts will be directed downwardly on the grates. The extension 80 in conjunction with the apron 82 seals the chamber at the upper end of the grates from the chamber at the lower side of the grates. At the lower ends of the grates, there is a rotary gate 86 which limits inward flow of air to the upper side of the grates while permitting the ash to be dischsrged. Alternatively, a vertically-suspended weighted gate 86A, FIG. 7, may be employed hinged at its upper end to swing outwardly in the event that a foreign object such as a stone or piece of tramp metal gets into the system along with the fuel. An ash bin 88 is mounted below the lower ends of the grates to receive the ash and clinkers and a screw 90 is mounted therein so as to discharge the ash and clinkers from the retort through a discharge conduit 92.

In all biomass material there is a certain amount of incombustible material usually referred to as sand and since it is relative fine, it sifts downwardly between the grate bars into the distribution chamber and from thence into the plenum chambers. In order to remove this sand, there are provided, FIG. 4, sand belts 100 entrained about sprockets 102 and 104 fixed to the shafts 32,34 with their upper run traveling through troughs 106 at the bottom of the plenum chambers, the trough being formed by barriers 108 welded or otherwise fastened to the bottoms of the plenum chambers in spaced, parallel relation to the side wall at the side adjacent the lower edges of the baffle plates 70 so that the sand slides down the baffle plates into the trough. The sand belts 100 are in the form of link chains and there are openings 110 in the end walls 55 from plenum chamber to plenum chamber through which the chains pass. The open link of the chains provide pockets which entrap the sand and convey it to the discharge end of the grate where it falls by gravity into the ash pit or onto a discharge conveyor as may be the case.

Figure 6:
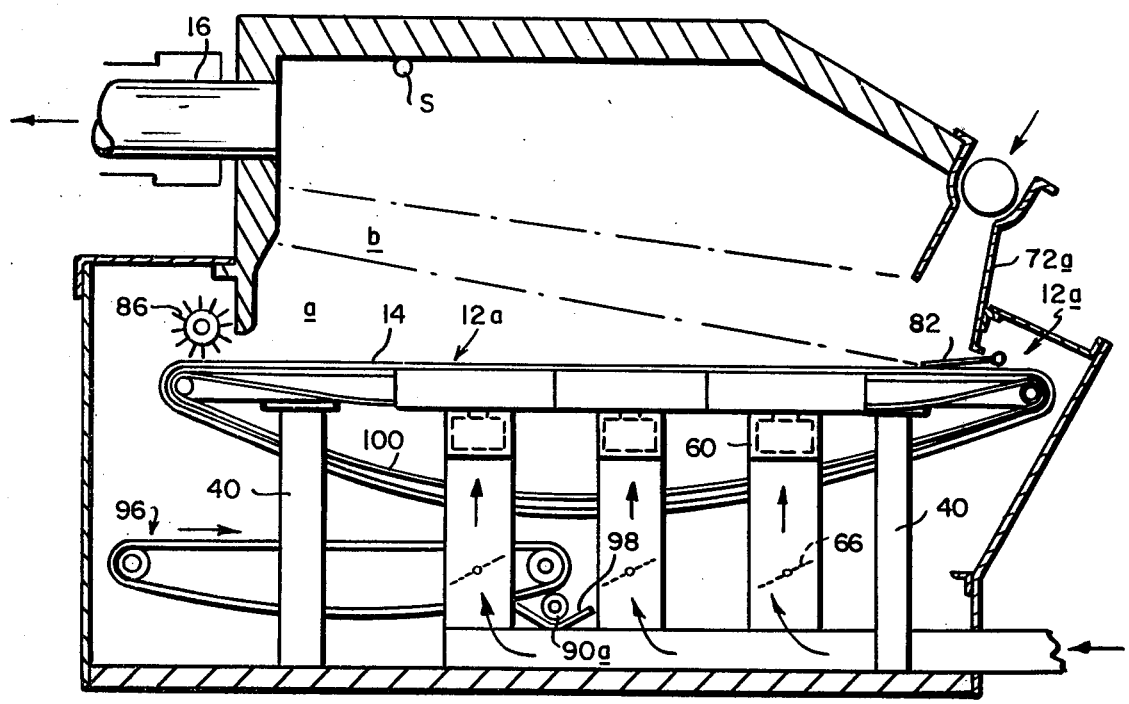
FIG. 6 is a side elevation of a retort wherein the grate beds are horizontal.
Figure 7:
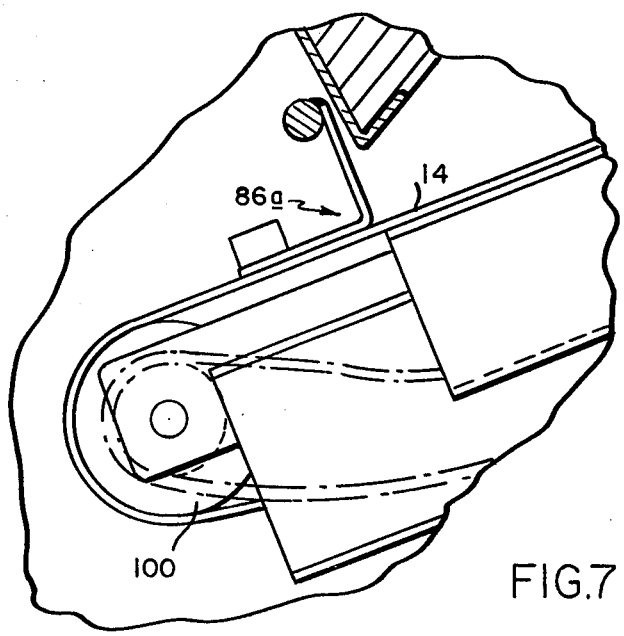
FIG. 7 is a fragmentary view at the discharge end of the grates showing an alternative form of gate for preventing air from entering the space above the grates.

FIG. 6 shows an alternative form of retort in which the grate beds 12a are disposed in a horizontal position, the biomass material is deposited at one end through a duct 72a and the ash is removed at the other end by discharging it onto a discharge conveyor 96. The grate beds are comprised of spaced, parallel bars 14a, there are distribution chambers 46 below the grate beds containing Venturi openings 48 and there are plenum chambers 52 through which primary air is supplied in different volumes, all as described above. At the discharge ends of the grate beds there are alternatively a rotary gate 86 as shown in FIG. 6 or a vertically-suspended weighted gate 86a as shown in FIG. 7.

In this form of the invention, an ash conveyor 96 is employed to receive the ash discharged from the discharge end of the grates, move it through the lower part of the retort in a direction opposite to and parallel to the lower sides of the grates and discharge it into an ash pit 98 containing a screw 90a for discharging it from the retort This arrangement provides for using the residual heat of the ash to preheat the primary air which is being supplied to the grates.

The entire structure is mounted on wheels 94 for rolling on spaced, parallel tracks 96—96 so arranged that the retort can be easily moved away from the heating unit to permit rapid changeover from wood burning to a standby fuel such as gas or oil.

The grate system thus described enables maintaining the temperature of the grate and the supporting structure therefor at a temperature which is well within a reasonable working range for available alloys suitable for grate structure and relieves thermal stresses both in the grates and in their supporting structure. This is due both to the fact that the grates are moving continuously so that the grate bars are exposed to the high heat of combustion for relatively short periods, that the continuous movement of the grates affords a positive means for continuous disposal of the ash and elimination of clinkers or slags, thus continuously maintaining clean grates beneath the flue beds which, in turn, provide rapid control of the firing rate and the new air distribution system wherein the air is supplied to the underside of the grates at a uniform pressure throughout its width and at the various zones of operation at pressures which are conducive to progressive distillation and primary oxidation of the biomass material as it descends from one zone to the next. The three zones disclosed permit the pressure or flow in each zone to be independently adjusted and to thus insure air flow which will be substantially equal for each grate module with respect to each particular zone. The number of zones may be a function of the length of the grates. In general, the longer the grates, the greater the number of zones.

The firing rate of the retort varies with the fuel density and the primary air flow rate. A typical firing rate for wood chips, for example, oak pulp chips may be up to 125 pounds per hour per square foot of great area. The air pressure drop across the grates at this rate may be approximately 0.2 inches of water. The flow control of the primary air may be regulated by means of the orifices at the bottoms of the plenum zone section to provide at full fire a pressure drop of at least five inches of water. This is achieved by advancing the biomass material toward the discharge end of the grate fast enough so that it builds up against the front wall 20 as shown in FIGS. 2 and 6 to a greater thickness than where it enters the retort. In this area of greater thickness, the evolution of the CO takes place in stages—in a lower stratum A according to the formula $C+O=CO+O=CO_2$ and in the high stratum B according to the formula $CO_2+C=CO$.

A sensor S may be placed in the retort above the grate to detect the presence of $CO_2$ and to effect adjustment of the feed rate and air pressure to maintain an atmosphere above the grate which is substantially free of $CO_2$. As a practical matter, however, since the generated gases are used to develope steam in a steam boiler, the steam pressure developed by the gases which are proportionate to the BTU developed by the burning of the gases is observed and by adjusting the feed rate and the air pressure to keep the steam pressure at a predetermined constant pressure, a maximum efficiency in the destructive distillation of the biomass can be maintained for the development of CO so that the gases generated about the bed contain substantially no $CO_2$.

An important aspect of the apparatus as constructed either in its inclined to horizontal form is to maintain a bed thickness throughout the length of the grate such that the gases generated in the space above the grate are comprised exclusively of the products of destructive distillation of the biomass and CO. This can be determined by either of the modes suggested above and by automatically adjusting the rate of feed and the rate of supply of the primary air to maintain the atmosphere free of $CO_2$.

It should be understood that the present disclosure is for the purpose of illustration only and includes all modifications or improvements which fall within the scope of the appended claims.

What is claimed is:

1. A retort for generating combustible gases by progressive destructive distillation of biomass material comprising means defining a chamber, a traveling grate bed supported within the chamber with a space above and a space below the grate bed, means at one end of the grate bed for delivering biomass material into the space above the grate bed onto the upwardly-facing side thereof for movement toward the other end, means within the space at the underside of the grate bed defining a distribution chamber substantially coextensive in width with the grate bed and containing midway of its width a longitudinal opening of Venturi configuration, means for controllably supplying air to the distribution chamber through said opening in an amount to effect destructive distillation and generation of combustible gases, said means for supplying air including a plenum chamber located below said distribution chamber, and means for collecting the combustible gases within the space above the grate bed for distribution.

2. A retort according to claim 1 wherein the grate bed is inclined and the biomass material is deposited at the upper end.

3. A retort according to claim 1 wherein the opening of Venturi configuration is defined by downwardly-extending diverging flanges along the longitudinal edges of the opening.

4. A retort according to claim 1 comprising means at the bottom of the plenum chamber for removing such incombustible material as fall through the grate bed into the distribution chamber and from thence gravitates into the plenum chamber.

5. A retort according to claim 1 comprising, a conveyor supported within the plenum chamber for movement in the direction of movement of the grate for removing such incombustible material as falls through the grate into the distribution chamber and from thence gravitates into the plenum chamber and means in the plenum chamber for guiding the gravitating material onto the conveyor.

6. Apparatus according to claim 5 wherein said last means comprises an inclined baffle plate extending from one side of the plenum chamber downwardly over the port at the bottom of the plenum chamber such that its free edge overlies the conveyor.

7. Apparatus according to claim 6 wherein the conveyor is a chain defining articulated pockets.

8. Apparatus according to claim 7 wherein there is means defining a channel at the bottom of the plenum chamber, and the conveyor is a chain moving along said channel.

9. A retort for generating combustible gases by progressive destructive distillation of biomass material comprising means defining a chamber, a traveling bed grate supported within the chamber with a space above it and a space below, means at one end of the grate bed for delivering biomass material into the space above the grate bed onto the upwardly-facing side thereof, means at the other end of the grate bed for removing and discharging such solids as gravitate from said other end of the grate bed, means in the space at the underside of the grate bed defining a V-shaped distribution chamber substantially coextensive in width with the grate bed and containing midway of its width a longitudinally-extending opening of Venturi configuration, means for controllably supplying air to the distribution chamber through said opening in an amount to effect destructive distillation and generation of combustible gases, said means for supplying air including a plenum chamber located below said distribution chamber, and means for collecting the combustible gases within the space above the grate bed for distribution.

10. A retort according to claim 9 wherein the grate bed is inclined and the biomass material is deposited at the upper end of the grate bed.

11. A retort for generating combustible gases by progressive destructive distillation of biomass material comprising means defining a chamber, a traveling grate bed, means supporting the grate bed in the chamber for linear movement with a space above the bed and a space below the grate bed, means at one end of the grate bed for supplying biomass material into the space above the grate bed onto the upwardly-facing side thereof, for movement thereon toward the other end, means in the space at the underside of the grate bed defining a V-shaped distribution chamber substantially coextensive in width with the grate bed and centrally of its width a longitudinally-extending opening of Venturi configuration, a plenum chamber located below the distribution chamber arranged to controllably supply air to the distribution chamber through said opening in such quantity as to effect destructive distillation and the generation of combustible gases, and means for collecting the combustible gases within the space above the grate bed and for effecting distribution thereof.

12. A retort according to claim 11 wherein the grate bed is inclined and the biomass material is deposited at the upper end of the grate bed.

13. A retort according to claim 11 wherein said opening is at the top of the plenum chamber and the latter is supplied with air through a port at the bottom of the plenum chamber and a baffle is mounted in the plenum chamber between the opening and the port.

14. A retort according to claim 11 wherein said opening is at the top of the plenum chamber and said opening is supplied with air through a port at the bottom of the plenum chamber and a baffle is mounted in the plenum chamber in a position inclined downwardly from the opening toward the port.

15. A retort according to claim 11 wherein said opening is at the top of the plenum chamber and said plenum chamber contains a port at the bottom, a conduit supplies air through the port to the plenum chamber and there is a damper in the conduit.

16. A retort for generating combustible gases by progressive destructive distillation of biomass material comprising means defining a chamber, a grate bed supported in the chamber with a space above and a space below it for linear movement therein, means for effecting movement of the grate bed, means at one end of the grate bed for supplying biomass material into the space above the grate bed onto the upwardly-facing side thereof for movement toward the other end of the grate bed, means in the space at the lower side of the grate bed defining a V-shaped distribution chamber coextensive in width with the grate bed containing at the bottom a medially-positioned, longitudinally-extending, narrow opening along the opposite sides of which there are downwardly-extending divergent flanges defining a Venturi opening, means for controllably supplying air to the distribution chamber by way of the converging flanges and opening to the distribution chamber in an amount to effect destructive distillation and generation of combustible gases, said means for supplying air including a plenum chamber located below said distribution chamber, and means for collecting the combustible gases in the space above the grate bed and for distribution thereof.

17. Apparatus according to claim 16 wherein the grate bed is inclined.

18. A retort for generating combustible gases by progressive destructive distillation of biomass material comprising means defining a chamber, a grate bed supported in the chamber with a space above it and a space below it for linear movement therein, means for effecting movement of the grate bed, means for supplying biomass material to one end of the grate at the upwardly-facing side thereof for movement toward the other end, means in the space at the underside of the grate bed defining a substantially V-shaped distribution chamber substantially coextensive in breadth and length with the grate bed and containing medially thereof a narrow, longitudinally-extending opening of Venturi shape, means spaced longitudinally of the grate bed below said distribution chamber for supplying controlled amounts of air to the distribution chamber through said Venturi opening in an amount to effect destructive distillation and generation of combustible gases and means for collecting the combustible gases within the space above the grate bed and for effecting distribution thereof.

19. Apparatus according to claim 18 wherein the grate bed is inclined.

20. A retort for generating combustible gases by progressive destructive distillation of biomass material comprising means defining a chamber, a grate bed supported in the chamber with a space above it and a space below, means for effecting linear movement of the grate bed, means for supplying biomass material to one end of the grate bed at the upwardly-facing side thereof for movement toward the other end, means in the space at the underside of the grate bed defining a V-shaped distribution chamber substantially coextensive in breadth and length with the grate bed and containing medially thereof a longitudinally-extending narrow opening of Venturi configuration and plenum chambers arranged longitudinally of the grate bed and below the distribution chamber for supplying air through the opening to the distribution chamber at a corresponding number of regions lengthwise of the grate bed, means for controllably supplying air to each of the plenum chambers independently of the others and means for collecting the combustible gases within the space above the grate bed for distribution.

21. Apparatus according to claim 20 wherein the grate bed is inclined.

22. A retort for generating combustible gases by progressive destructive distillation of biomass material comprising means defining a chamber, a grate bed supported in the chamber with a space above it and a space below it, means for effecting linear movement of the grate bed, means for supplying biomass material to one end of the grate bed at the upwardly-facing side thereof, for movement toward the other end, means in the space at the underside of the grate bed defining a substantially V-shaped distribution chamber which is substantially coextensive in breadth and length with the grate bed and contains medially thereof a longitudinally-extending opening of Venturi shape, plenum chambers arranged successively longitudinally of the grate bed and below the distribution chamber for supplying air to a corresponding number of successive regions of the grate bed, each of said plenum chambers containing at the bottom a port, a conduit connected at one end to each port, a damper in each conduit, means for supplying controlled amounts of air to the opposite ends of the several conduits to effect destructive distillation and the generation of combustible gases and means for collecting the combustible gases above the grate bed and for distribution thereof.

23. Apparatus according to claim 22 wherein the grate bed is inclined.

24. A retort for generating combustible gases by progressive destructive distillation of biomass material comprising means defining a chamber, side-by-side grate beds supported in the chamber with a space above them and a space below them, means for effecting linear movement of the grate beds, means for supplying biomass material to one end of the grate beds at their upwardly-facing sides for movement toward the other end, each grate bed comprising spaced, parallel grate bars defining openings of such size as to permit air to flow through, but to prevent biomass material from falling through, means in the space beneath each grate bed defining a distribution chamber coextensive in width with the grate bed and having a bottom spaced downwardly from the grate bed, said bottom containing medially thereof a narrow Venturi opening extending longitudinally thereof, means for controllably supplying air through the several Venturi openings to the several grate beds to effect destructive distillation of the biomass material and the generation of combustible gases, said means for controllably supplying air including a plenum chamber and means for collecting the combustible gases in the space above the grate beds for distribution and means for controlling the supply of air to said Venturi openings.

25. A retort for generating combustible gases by progressive destructive distillation of biomass material comprising means defining a chamber, side-by-side linearly-movable grates supported within the chamber with a space above the grates and a space below the grates for linear movement therein, means at one end of the grates for delivering biomass material to the upwardly-facing sides thereof, said grates containing openings of such size as to permit air to flow through, but to prevent biomass material from falling through, means in the space beneath each grate defining a V-shaped distribution chamber substantially coextensive in width and length with the grate, said distribution chamber having a bottom wall spaced downwardly from the grate containing medially thereof a narrow opening extending longitudinally thereof of Venturi shape, plenum chambers situated successively lengthwise of each grate and below the distribution chamber in communication with the distribution chamber through said narrow opening, means for supplying air at equal pressure to corresponding plenum chambers transversely of the system and at different pressures to successive plenum chambers longitudinally of the system and means in the space above the grates for collecting the combustible gases for distribution.

26. Apparatus for generating combustible gases by progressive destructive distillation of biomass material comprising a retort defining a closed chamber, a grate system supported in the chamber comprising side-by-side linearly movable grates supported within the chamber with a space above the grates and a space below the grates, each grate comprising spaced, parallel, articulated grate bars, means at one end of the grates for supplying biomass material to the upwardly-facing sides thereof, means beneath the grates defining substantially V-shaped distribution chambers substantially coextensive in width and length with the grates, said distribution chambers having a bottom wall spaced downwardly from the grates containing medially thereof longitudinally-extending openings of Venturi shape, means in the space at the underside of the grates below the distribution chambers for supplying air to the distribution chambers comprising plenum chambers arranged successively along the grates which are coextensive with predetermined zonal lengths of the grates, each plenum chamber containing a top opening in communication with the distribution chamber, conductor means for supplying air to each respective plenum chamber and a damper for controlling the air delivered to the plenum chamber and means for collecting the combustible gases within the space above the grate bed for distribution.

27. Apparatus for generating combustible gases by progressive destructive distillation of biomass material comprising a retort defining a closed chamber, an endless grate comprising spaced, parallel, articulated grate bars, means in the retort supporting the endless grate above the bottom so that there is a space above and a space below the grate, means for effecting movement of the grate, means at one end of the grate for supplying biomass material to the upwardly-facing side of the grate for movement toward the other end, means in the space at the underside of the grate defining a distribution chamber at the underside which is substantially coextensive in width and length with the grate, said distribution chamber having a bottom wall spaced downwardly from the grate containing medially thereof a longitudinally-extending Venturi opening, plenum chambers arranged in succession below said bottom wall dividing the grate into successive zones, said plenum chambers being in communication with said distribution chamber and means for controllably supplying air to the several plenum chambers at different predetermined pressures and means for collecting the combustible gases within the space above the grate bed for distribution.

28. Apparatus according to claim 27 wherein the means supporting the grate comprise longitudinally-spaced sprockets.

29. Apparatus according to claim 27 wherein the means supporting the grate comprises a rigid frame, shafts at the opposite ends of the frame and sprockets affixed to the shafts about which the endless grate is entrained, and means at the opposite sides of the plenum chambers upon which the upper run of the grate between the sprockets rest.

30. Apparatus according to claim 27 wherein there is a discharge conveyor in the lower part of the retort in the space below the grate bed for gravitationally receiving ash discharged from the grate bed and conducting it to an ash pit for discharge and wherein the conveyor is moved in a direction opposite to that of the grate bed.

31. Apparatus according to claim 30 wherein the discharge conveyor is parallel to the underside of the grate bed so that the residual heat from the ash borne thereby is available for preheating the air.

32. Apparatus for generating combustible gases comprising a retort defining a closed chamber containing inlet and outlet openings, said inlet opening providing for introducing biomass material thereto for destructive distillation and said outlet opening providing for removal of ash, a traveling endless grate supported in said retort with one end adjacent the inlet opening and the other end adjacent the outlet opening, said retort containing above the grate a discharge opening for the gases generated by destructive distillation of the biomass material, means at the underside of the grate defining a chamber at the underside which is substantially coextensive in width and length with the grate bed, said chamber having a bottom wall spaced downwardly from the grate containing medially thereof a Venturi opening, plenum chambers arranged in succession below said bottom wall dividing the grate longitudinally into successive zones, each plenum chamber being in communication with said chamber, and means for controllably supplying air to the several plenum chambers at different predetermined pressures.

33. Apparatus according to claim 32 wherein a screw is mounted to the retort for delivering biomass material to the inlet opening.

34. Apparatus according to claim 32 wherein a screw is mounted within the retort at the lower end of the grate for discharging ash and clinkers through the outlet opening.

35. Apparatus according to claim 32 wherein there is an ash pit at the end of the grate bed from which the ash and clinkers are discharged for receiving the ash and clinkers and a screw in the ash pit for discharging the ash and clinkers from the ash pit through the outlet opening.

36. Apparatus according to claim 35 wherein there is a rotary gate at the end of the grate from which the ash and clinkers are discharged for preventing flow of air to the space above the grate bed.

37. Apparatus according to claim 36 wherein the rotary gate seals the portion of the chamber above the grate from the portion below the grate.

38. Apparatus according to claim 32 wherein there is an apron at the upper end of the grate below the inlet opening for receiving the biomass material descending through the inlet opening and sealing the chamber above the grate from the chamber below the grate.

39. Apparatus according to claim 32 wherein there is a pivotally suspended weighted gate at the end of the grate from which the ash and clinkers are discharged for preventing flow of air to the space above the grate bed.

* * * * *